(12) United States Patent
Kean et al.

(10) Patent No.: US 12,518,405 B2
(45) Date of Patent: Jan. 6, 2026

(54) VISUAL LOCALIZATION AND FEATURE DETECTION FOR AN IMPLEMENT TRACKING SYSTEM

(71) Applicant: LEICA GEOSYSTEMS TECHNOLOGY A/S, Odense SØ (DK)

(72) Inventors: Michael Goulet Kean, Odense C (DK); Tommi Juhani Kauppinen, Odense C (DK); Morten Nissen, Odense M (DK)

(73) Assignee: LEICA GEOSYSTEMS TECHNOLOGY A/S, Odense SØ (DK)

( * ) Notice: Subject to any disclaimer, the term of this patent is extended or adjusted under 35 U.S.C. 154(b) by 295 days.

(21) Appl. No.: 18/383,438

(22) Filed: Oct. 24, 2023

(65) Prior Publication Data

US 2024/0135554 A1 Apr. 25, 2024
US 2024/0233142 A9 Jul. 11, 2024

(30) Foreign Application Priority Data

Oct. 24, 2022 (EP) .................................... 22203409

(51) Int. Cl.
*G06T 7/246* (2017.01)
*E02F 9/26* (2006.01)
(Continued)

(52) U.S. Cl.
CPC .............. *G06T 7/251* (2017.01); *E02F 9/261* (2013.01); *E02F 9/264* (2013.01); *G06T 7/75* (2017.01);
(Continued)

(58) Field of Classification Search
CPC ........... G06T 2207/30252; G06T 7/246; G06T 7/251; G06T 7/75; G06T 7/73;
(Continued)

(56) References Cited

U.S. PATENT DOCUMENTS

2012/0075343 A1 3/2012 Chen et al.
2019/0093320 A1 3/2019 Forcash et al.
(Continued)

FOREIGN PATENT DOCUMENTS

EP 3 086 196 A1 10/2016
JP 2019-167719 A 10/2019
(Continued)

OTHER PUBLICATIONS

Extended European Search Report dated Apr. 12, 2023 as received in Application No. 22203409.2.

*Primary Examiner* — Matthew C Bella
*Assistant Examiner* — Janice E. Vaz
(74) *Attorney, Agent, or Firm* — Maschoff Brennan

(57) ABSTRACT

A method for tracking a movable implement of a work vehicle. The method comprises the steps of 1.) accessing images during movement of the work vehicle providing a view onto an environment and at least part of the implement, 2.) providing by a feature tracking algorithm a 3D environment model and referencing of the sensor pose to the 3D environment model, 3.) tracking implement features at different poses of the implement and, determining implement tracking data providing positional and arrangement information for the implement features, 4.) accessing benchmark information providing a real distance between two benchmark points, 5.) using the benchmark information to provide the implement tracking data with absolute scale information, and 6.) using the implement tracking data for the tracking of the implement.

17 Claims, 5 Drawing Sheets

(51) Int. Cl.
*G06T 7/73* (2017.01)
*G06T 7/80* (2017.01)

(52) U.S. Cl.
CPC ...... *G06T 7/80* (2017.01); *G06T 2207/30244* (2013.01); *G06T 2207/30252* (2013.01)

(58) Field of Classification Search
CPC ............ G06T 2207/30244; G06T 7/80; G06T 2207/10028; G06V 10/25; G01B 11/00; G01C 11/04; E02F 9/261; E02F 9/264
See application file for complete search history.

(56) References Cited

U.S. PATENT DOCUMENTS

2021/0230842 A1* 7/2021 Vorobiev .................. G06T 7/50
2022/0389685 A1* 12/2022 Kovanen ................ G01S 17/06

FOREIGN PATENT DOCUMENTS

| WO | 2019/197064 A1 | 10/2019 |
| WO | 2021/105204 A1 | 6/2021 |

* cited by examiner

VISUAL LOCALIZATION AND FEATURE DETECTION FOR AN IMPLEMENT TRACKING SYSTEM

FIELD

The present disclosure relates to a method of tracking an implement of a work vehicle. The pose of the implement might be changed along a plurality of degrees of freedom when the implement is attached to the work vehicle. The present disclosure further relates a camera based system to provide calibration information and/or pose data regarding the said implement. Furthermore, the present disclosure relates to a computer program product for the automatic, computer controlled execution of the method.

BACKGROUND

Contemporary work vehicles are high value assets. Thus, general purpose work vehicles appropriate for a plurality of task are preferred over specialized ones. One way to provide a flexibility is to provide a work vehicle with universal joints for a rapid exchange of the implements. E.g. a typical excavator might be provided with a wide, large capacity (mud) bucket with a straight cutting edge is used for cleanup and levelling and a teethed bucket for cutting harder material. Furthermore, instead of a bucket they might be equipped with a rake. Similarly, a purpose-built loader or a tractor can also have a series of loading implements for different applications. For brevity and transparency from here on only front loader types of work vehicles will be discussed in details. The specific features of other work vehicles might be applied accordingly.

Modern earth-moving machines are also configured for partly or fully automatized controls. Automatized in the sense of the present disclosure means that an operator of the machine provides a command on the desired movement of the vehicle and/or the implement in an external or vehicle centered coordinate system. The controller of the work vehicle in the next step translates such a desired movement to actual actuator control commands. Colloquially automatized controlling systems operating in vehicle centered coordinate systems are called 2D-systems, while controllers operating relative to an external coordinate system are called 3D systems. By way of example 3D systems are discussed in more details. The specifics of 2D systems might be applied accordingly.

In principle, it is possible to operate a work vehicle in an automatized fashion without any environment model or on the basis of static models, e.g. a construction site plan. This mode of operation is, however, not recommended due to the possible risk of accidents resulting in personal injury or high property damage. Preferably, the work vehicle access dynamic environment information and provide localization information relative to environment objects to the operator, in particular the work vehicle exhibits a crash avoidance feature.

There are various measuring systems known for the specific needs in the field of construction, especially for earth-moving machines, such as excavators, graders or dozers. Such measuring systems can be used to build a digital 3D model of the surroundings of the vehicle, to detect obstacles in the surroundings, and/or to support a control of the work vehicle. For example, EP 3 086 196 A1 suggests an environment detection by means of a camera system arranged on a crawler. The camera system uses a simultaneous localization and mapping (SLAM) or structure from motion (SfM) algorithm to generate a 3D point cloud of the environment. JP 2019 167 719 A2 discloses a laser scanner by means of which a 3D model of the environment is generated when an excavator, with the scanner mounted, is pivoting. WO 2019/197064 A1 shows a device for monitoring an environment of the vehicle with a time of flight (ToF) camera. Images generated this way aide the operator of the work vehicle in controlling the operation of the vehicle on the construction site according to a plan.

Aside from localizing the work vehicle itself, it is often desirable to know the pose of the implement relative to the environment objects. It is especially important for crawlers, loaders or grader, wherein the contact domain of the implement performing the earth moving task is not visible from the driver cabin. Consequently, the operator either has to estimate the pose of the contact domain based on his experience or have to rely on sensor readings. Contemporary work vehicle are equipped with a set of internal sensors in the form of inclinometers, accelerometers, strain gauges etc. to provide a sensor reading regarding the state of various components of the work vehicle. However such sensors exhibit considerable drift, especially under the harsh conditions experienced during a typical earth moving task. The sensors might also experience shock forces above the tolerance level of the said sensors. Since the operation of these sensors requires direct contact with the implement and/or the arm providing the movement of the implement they cannot be mounted in a safe, unexposed location.

Image based methods are advantageous as an imaging sensor, in particular a camera, might be placed in a relatively inert, unexposed location of the work vehicle.

In view of the above circumstances, the object of the present disclosure is to provide an image based tracking method for an implement movement.

A further objective of the present disclosure is to provide a more efficient workflow, in particular during an implement change.

SUMMARY

The present disclosure relates to a method for tracking a movable implement of a work vehicle. The method comprises the steps of 1.) accessing image data comprising images recorded by an imaging sensor during movement of the work vehicle and providing a view associated to a sensor pose of the imaging sensor referenceable to a vehicle pose onto an environment and at least part of the implement during movement of the implement relative to the imaging sensor, 2.) deriving 3D map data by applying a feature tracking algorithm to the image data, wherein the 3D map data provide a 3D environment model and relative referencing of the sensor pose within the 3D environment model, 3.) tracking implement features imaged by the image data at different poses of the implement relative to the imaging sensor and, based thereof, determining implement tracking data providing a.) positional information for the implement features within the 3D environment model, and b.) arrangement information of the implement features with respect to each other, in particular in an implement-centered coordinate system, 4.) accessing benchmark information that provides a real distance between two benchmark points of the environment imaged by the image data and/or a real distance between two benchmark points of the implement imaged by the image data, and using the benchmark information to provide the implement tracking data with absolute scale information, such that the positional information provides for deriving changes of position of the implement features in an absolute scale, and 5.) using the implement tracking data for the tracking of the implement. It is self-explanatory for the skilled artisan that the utilization of numerals and letters does not represent a sequence of performing the steps, but rather a listing of the steps to be carried out in a sensible order. Variations in the execution order of the steps of any embodiment of the method are within the sense of the present disclosure.

Image data in the sense of the present disclosure might be data acquired by photographic means. Image data might also be images reconstructed from other types of data, in particular data obtained by scanning means. The present disclosure is not limited to a certain class of images, other than that the said image data is appropriate for processing by the feature tracking algorithm.

The sensor pose relative to the work vehicle might be a fixed pose, however the present disclosure is not limited to such a setup. On the contrary, the present disclosure might be applied in cases where the sensor exhibits own motion. The sensor pose might be adjusted manually or automatically during the execution of the method. A pose change of the sensor relative to the environment is derivable from a pose change of the work vehicle relative to the environment, e.g. by translational movement, and an own motion of the sensor, e.g. a swiveling movement to keep a tracked feature in the field of view of the sensor. While the pose change of the sensor relative to the work vehicle and the pose change of the work vehicle relative to environment has to be known, the present disclosure is applicable without knowing the pose of the work vehicle relative to the environment and/or the pose of the sensor relative to the work vehicle.

The feature tracking algorithm might comprise different sub-algorithms. Such sub algorithms might be independently capable of contributing to the derivation of the 3D environment model. The different sub-algorithms might be optimized for different feature tracking tasks and/or conditions, e.g. image brightness, distance of a tracked object to the sensor, relative velocity of an object in the image, etc. The present disclosure is not limited to the use of the same feature tracking sub-algorithm for tracking the environment and implement features. Furthermore, the present disclosure might utilize multiple feature-tracking sub-algorithms to track the implement and/or environment features. The 3D environment model and/or the arrangement information of the implement features might be derived on the basis of the feature tracking algorithm as a whole and not on the independent sub-algorithms.

The benchmark information might be based on referencing objects. The benchmark information might be based on accessing model data of the environment comprising distances of a plurality of environment features and a respective model data regarding the implement. The benchmark information might be based on direct distance measurements, in particular by laser time of flight measurement, or by indirect distance measurements, in particular by a triangulation measurement based on two measuring poses. The benchmark information might be based on a tracked pose change of the work vehicle, in particular by a GNSS based tracking.

The implement tracking data represent an actual state of the implement in the environment. It might be utilized to aid the performance of operations of the work vehicle relative to the environment, e.g. loading the bucket from an earth heap or tearing out a tree trunk.

In some embodiments an image of the implement is provided to the operator and an operator input is required on the location of the features of the image. The operator might select, accept, reject or reproject some implement features. A similar action might be carried out regarding the environment features.

In some embodiments the method comprises a first implement benching to provide the benchmark information. The first implement benching comprises the steps of 1.) providing an environment referencing object, in particular a referencing mat, with two benching points, 2.) in a first pose of the implement touching a first benching point with a first feature of the implement and recording the first pose of the implement, 3.) in a second pose of the implement touching a second benching point with the first feature of the implement and recording the second pose of the implement, 4.) in a third pose of the implement touching the second benching point with a second feature of the implement and recording the third pose of the implement, and 5.) providing the absolute scale information, based on the first, second and third poses of the implement, in particular wherein the first and second features of the implement comprising edges and/or corners of the implement.

In some embodiments the environment referencing object is identified automatically based on the image data, in particular by the feature tracking algorithm. Upon identifying the environment referencing object the first implement benching might be executed in automatized manner, after receiving an operator approval or fully automatically. These embodiment are especially advantageous to obtain arrangement information of the implement features after an implement change e.g. in a motor pool with a collection of implements and at least one environment referencing object. The environment referencing object might be a pre-existing object in the environment, e.g. power mast with standardized dimension. The environment referencing object might be a purpose-designed referencing object, e.g. a referencing mat with known shapes and dimensions and high contrast to simplify a feature tracking. The utilization of purpose-designed referencing objects is especially advantageous for the present disclosure. However, the present disclosure might be applied without such referencing objects.

In some embodiments the referencing object is identified based on a stored database comprising a list of referencing objects with associated trackable features enabling an identification of referencing objects by the feature tracking algorithm and associated absolute scale information to derive the benchmark information.

In some embodiments the method comprises a second implement benching to provide the benchmark information. The second implement benching comprises the steps of 1.) providing a benching object comprising a benching contact, 2.) in a fourth pose of the implement touching the benching contact with a third feature of the implement and recording the fourth pose of the implement, 3.) in a fifth pose of the implement touching the benching contact with a fourth feature of the implement and recording the fifth pose of the implement, 4.) providing an absolute distance information between the third feature of the implement and the fourth feature of the implement, in particular on the basis of the pose change of the work vehicle, and 5.) providing the absolute scale information based on the absolute distance of the third and the fourth feature of the implement. Unlike to the first implement benching with an environment referencing object comprising two benching points, the second implement benching might be executed with any suitably stable, inert object in the environment. With alternative wording, the dimensions of the benching object does not have to be known and a single benching contact is sufficient to perform the second implement benching. The benching contact can be any arbitrary domain on the benching object allowing the execution of the method. The benching contact and the third feature of the implement might be both point like. The third feature and/or the benching contact might be spatially extended, in particular the benching contact might be a pole or equivalent, and the absolute distance information between the third and the fourth features of the implement might be provided by projecting to a plane perpendicular to the extension of the benching contact.

Since the benching object does not provide an absolute scale information an external absolute scale information is required for the execution of the second implement benching. In some embodiments the dimensions of the implement are known, in particular via specifications and/or digital design data provided by the manufacturer. Alternatively the absolute scale information might be provided by fixing the relative pose of the implement to the work vehicle and a tracked, in particular tracked by a GNSS receiver, movement of the work vehicle provides the pose change between the fourth and fifth pose of the implement.

In some embodiments the image data comprises a first set of images, wherein the first set of images comprises at least one image of the unmounted implement such that a contact domain of the implement and a plurality of implement features are visible. The arrangement information of the implement features with respect to each other in an implement coordinate system are provided by utilizing the first set of images. Since contemporary work vehicles typically exhibit an ability for fast implement change, in particular by fast couplers, these embodiments provide an especially efficient way of obtaining arrangement information of the implement features. Another advantage of these embodiments is the direct observation of the contact domain, in particular a cutting edge, of the implement and its geometric relation to the further implement features, i.e. a digital model of the implement might be obtained. If an equivalent data with absolute scale is known from other sources, in particular as data provided by the implement manufacturer, the implement itself might provide the benchmark information.

In some embodiments the image data comprises a second set of images comprising two images. The first image of the second set comprises a plurality of tracked environment features, while the second image of the second set comprises the tracked environment features from the first image of the second set. During the acquisition of the first and second images of the second set of images the poses of the sensor relative to the environment are different and poses of the implement relative to the sensor are identical.

In some embodiments the image data comprises a third set of images comprising two images. The first image of the third set comprises a plurality of tracked implement features, while the second image of the third set comprises the plurality of tracked implement features from the first image of the third set. During the acquisition of the first and second images of the third set of images the poses of the sensor relative to the environment are identical and the poses of the implement relative to the sensor are different. Two images respectively in the second and third set of images represents the minimal number required to perform these specific embodiments. Alternative methods, in particular a continuous tracking of the features might be equally applicable to realize the present disclosure.

In some embodiments the method further comprises an implement pose sensor calibration. The implement pose sensor calibration comprises the steps of 1.) acquiring the first image of the third set at a first implement pose sensor calibration state and assigning implement pose sensor readings regarding a pose of the implement to the image, 2.) acquiring the second image of the third set at a second implement pose sensor calibration state and assigning the implement pose sensor readings to the image, and 3.) providing implement pose sensor calibration parameters based on the poses of the implement respectively derived from implement tracking data and the assigned implement pose sensor readings. Utilizing the present disclosure to calibrate further sensors, in particular the inertial sensors of the implement control is a beneficial application of the present disclosure. Performing an implement pose sensor calibration might provide further sensor reading regarding the pose of the implement. The imaging sensor might be turned off/removed and the work vehicle might be operated on the basis of the sensor readings of the implement pose sensors. The implement pose sensors might provide a backup tracking if the imaging sensor loses the visual tracking of the implement features.

In some embodiments accessing benchmark information comprises the steps of 1.) acquiring the first image of the second set of images in a first benchmark position, 2.) providing steering commands to steer the work vehicle to a second benchmark position by a translation movement along a view axis of the imaging sensor, and providing a pose change between the first and second benchmark positions, in particular by utilizing a GNSS receiver, 3.) acquiring the second image of the second set of images in a second benchmark position, and 4.) providing the benchmark information based on the relative arrangement of the environment features in the second set of images and the pose change between the first and second benchmark positions.

In some embodiments the implement comprises an implement referencing object, in particular a referencing plate with known, standardized dimensions and/or two markers placed at a known distance from each other. The benchmark information provided further on the basis of tracking two features of the implement referencing object by the feature tracking algorithm. The implement referencing object might be a pre-existing object in the implement, e.g. bucket ears with standardized dimension. The implement referencing object might be a purpose-designed referencing object, e.g. a referencing plate with known shapes and dimensions and high contrast to simplify a feature tracking. The utilization of purpose-designed referencing objects is especially advantageous for the present disclosure. However, the present disclosure might be applied without such referencing objects. Embodiments wherein such referencing objects are not utilized are advantageous, since such delicate referencing objects might be damaged during the operation of the work vehicle. Alternatively such referencing objects might be temporarily provided to access the benchmark information.

In some embodiments the benchmark information is provided further on the basis of a digital model of the implement. The digital model of the implement comprises distances and/or sizes of implement features, in particular a length and/or distances of corners and/or distances of implement mounting elements. The digital model might be provided by the manufacturer. The digital model might be provided by a 3D imaging of the implement, in particular by a scanning with a laser scanner.

In some embodiments the method further comprises an imaging sensor correction based on the digital model of the implement. The imaging sensor correction comprises the steps of 1.) providing the digital model of the implement, 2.) providing the arrangement information of the implement features in a plurality of implement poses relative to the imaging sensor such that the arrangement information of the implement is referenceable to the digital model of the implement, 3.) deriving camera distortion data based on a deviation of the arrangement information of the implement features at the respective implement pose and the digital model of the implement, 4.) deriving correction parameters to the imaging sensor based on the camera distortion data, and 5.) applying the correction parameters in providing the 3D environment model and the relative referencing of the sensor pose within the 3D environment model. These embodiments are especially beneficial since imaging sensor might be calibrated in the field.

In some embodiment the feature tracking algorithm is based on 1.) scale invariant feature transformation (SIFT), and/or 2.) speed up robust feature (SURF), and/or 3.) binary robust independent elementary features (BRIEF), and/or 4.) features from accelerated segment test (FAST), and/or 5.) SfM, and/or 6.) SLAM. It is clear that the feature tracking algorithm might comprise multiple sub-algorithms each independently capable of realizing the feature tracking in the sense of the present disclosure. The sub-algorithms might be optimized for different tasks, e.g. tracking near-field or far field objects, different environmental conditions, e.g. illumination, haze. Multiple sub-algorithms might be utilized in parallel to track the same features to provide robustness for the feature tracking algorithm. Some features might be tracked by a first sub-algorithm while other features in the same image might be tracked by a second sub-algorithm. The skilled person understands that the above list is non-exclusive and might be combinable with similar or alternative methods.

The present disclosure also relates to a system for tracking an implement of a work vehicle configured to carry out a selected embodiment. The system comprises a computing unit and an imaging sensor.

The imaging sensor is configured to be arranged on the work vehicle such that a pose of the imaging sensor is referenceable to the work vehicle and to provide image data to the computing unit enabling a tracking of a movement of the implement relative to the environment. The imaging sensor might be a camera, in particular a monocular camera.

The imaging sensor might comprise a plurality of cameras, in particular to provide spectral or hyperspectral images. The imaging sensor might provide the image data by scanning the environment with a scanning beam, in particular the imaging sensor might be a lidar system.

The computing unit is configured to execute a feature tracking algorithm to track implement and environment features based on the received image data and to derive a pose of the implement relative to the environment utilizing the feature tracking algorithm. The computing unit is configured to provide a 3D environment model and relative referencing of the sensor pose within the 3D environment model based on the tracking of environment features. The computing unit is configured to carry out the required mathematical and geometrical operations with the image data.

In some embodiments the system further comprises an input interface and an output interface. The input interface is configured to receive operator steering commands regarding a desired pose or movement of the implement, in particular by utilizing the 3D environment model. The computing unit further configured to provide implement movement commands based on the received operator steering commands and further based on the pose of the implement relative to the environment. The output interface is configured to display a.) the 3D environment model, b.) a representation of the desired pose or movement of the implement in the 3D environment model, and c.) arrangement information of the implement features with respect to each other.

The input interface might comprise one or more joysticks, and/or one or more buttons, and/or one or more button boxes, and/or one or more switches and/or a touchscreen. The input interface might realize certain functions redundantly, i.e. some functions might be activated both via a button or a touchscreen command. The input interface might be configured to receive operator steering commands regarding a desired pose or movement of the work vehicle, in particular it might comprise a steering wheel and pedals to operate the work vehicle. The input interface might be configured to receive operator steering commands regarding a desired relative pose or movement of the imaging sensor, in particular the imaging sensor might be rotated relative to the work vehicle. The above list is non-exclusive and the skilled artisan might provide an appropriate similar or alternative input interface.

The output interface might be realized by a touchscreen. The output interface might be a display without touch functionality. The output interface might be temporarily attached. The output interface might be configured provide visual or audio signals, in particular to avoid a collision with an environment object.

In some embodiments the computing unit is configured to receive digital representation data on at least a part of the environment. The digital representation data comprises a.) information representing a present and/or a past and/or or a planned future state of the environment, and/or, b.) information representing a work task to be carried out by the work vehicle. The computing unit is further configured to a.) reference the digital representation data to the 3D environment model, b.) provide implement movement commands further based on the digital representation data, and c.) update the digital representation data based on the image data. The digital representation data might be a 3D data, in particular a computer aided design or building information model data. The digital representation data might be a point cloud representing the environment. The digital representation data might be 2D data, e.g. a map. The digital representation data might comprise multiple layers describing the work task, in particular comprising information regarding a before-after state.

In some embodiment the system comprises a set of positioning sensors configured to provide data on a vehicle pose change. The set of positioning sensors comprises one of 1.) a GNSS receiver and/or 2.) an odometer, and/or 3.) an inertial navigation system, and/or 4.) a total station positioning system (TPS). The computing unit is further configured to provide the benchmark information based on the data from the set of positioning sensor. The set of positioning sensors might comprise a plurality of the above listed example, or comprise further sensors configured to provide the vehicle pose change.

In some embodiments the work vehicle is one of a crawler, a wheel loader, or a tractor. The implement comprises a contact domain configured to contact work objects is the environment. The pose of the contact domain is derivable from the pose of the implement features, in particular wherein the contact domain is not visible by the operator. The computing unit is configured to derive the pose of the contact domain based on the tracked implement features. The system comprises a display configured to display the pose of the contact domain relative to the environment.

While not limited to the above example one especially beneficial way of utilizing the present disclosure is to provide pose information of a contact domain, in particular a cutting edge, not visible during the execution of the work task. Even more beneficial if the tracked implement features are pre-existing features of the implement, e.g. corners and edges or elements of the implement joint. This utilization of the disclosure enables a precise and efficient execution of the work tasks without directly seeing the contact domain and without attaching delicate components to the implement during e.g. an earth moving task.

In some embodiments the system further comprises a set of implement pose sensors configured to provide an implement pose based on implement pose sensor readings. The computing unit is configured to execute a visual tracking mode and a sensor tracking mode. In the visual tracking mode positional information for the implement features within the 3D environment model are provided by the imaging sensor. In the sensor tracking mode the positional information for the implement features within the 3D environment model are provided by the implement pose sensor. The sensor tracking mode might be activated when the imaging sensor loses the tracked implement features. The computing unit is further configured to reestablish visual tracking of the implement features based on data provided by the sensor tracking mode. The visual and sensor tracking modes might run parallel, wherein the sensor tracking mode might aid the visual tracking mode.

In some embodiments the implement pose sensor exhibit a calibration mode and a measurement mode. In the calibration mode calibration parameters of the implement pose sensor are calibrated utilizing the visual tracking mode either by a.) executing a calibration movement action of the implement, in particular the calibration movement according to the described implement pose sensor calibration method, or b.) adjusting the implement pose sensor calibration parameters based on a deviation between positional information for the implement features within the 3D environment model provided by visual and sensor tracking modes. In the measurement mode the implement pose sensor provides implement pose sensor data for executing the sensor tracking mode.

In some embodiments the implement pose sensor configured to provide a request for calibration feedback based on a.) the deviation between positional information for the implement features within the 3D environment model provided by visual and sensor tracking modes, and/or b.) a time elapsed since the last calibration, and/or c.) a shock event, wherein a measured velocity or acceleration exceeding a shock threshold.

The present disclosure also relates to computer program product. The computer program product comprises a program code stored on a machine-readable medium, or embodied by an electromagnetic wave comprising a program code segment. The computer program product has computer-executable instructions for performing, in particular when run on a computing unit of a system, the computational steps of a selected embodiment of the method.

BRIEF DESCRIPTION OF THE DRAWINGS

By way of example only, specific embodiments of the disclosure will be described more fully hereinafter with reference to the accompanying figures, wherein.

DETAILED DESCRIPTION

Figure 1:
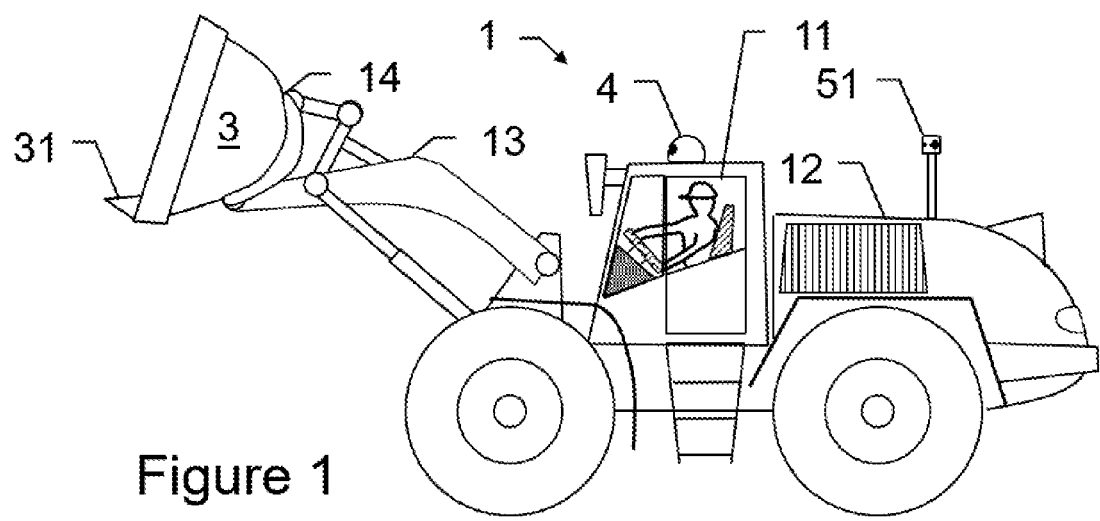
FIG. 1 shows an exemplary of a work vehicle as a wheel loader.

FIG. 1 depict a work vehicle 1 embodied as a wheel loader. The vehicle 1 has a chassis with a driver cabin 11 and an engine compartment 12. The work vehicle might be equipped with a set of positioning sensors 51/sensor aides, in the here depicted embodiment a reflector comprised by a TPS. An implement 3, embodied as a bucket, is mounted on an arm 13 via an implement joint 14. The arm 13 and the implement joint 14 provide a movement for the implement 3. The implement 3 comprises a contact domain 31, here a teethed cutting edge, configured to contact work objects is an environment. This means that the position of the contact domain has to be known for the precise execution of the tasks. However, as shown in FIG. 1, during a typical operation of many work vehicles 1, the contact domain 31 is not visible from the driver cabin 11, i.e. the operator has to estimate the pose of the contact domain, or for a better result, sensor readings regarding the position of the contact domain should be provided.

The work vehicle 1 is also equipped with an imaging sensor 4 depicted as a monocular camera in a dome mounted on the top of the driver cabin 11. There are many variations of the here depicted arrangement. The present disclosure is not limited in the placement of the imaging sensor 4 as long as it can provide a reasonable view of the environment and the implement 3. The present disclosure is applicable in combination with a monocular camera as the imaging sensor 4. The present disclosure might be equally applicable with a binocular camera or any arrangement comprising a plurality of cameras. For embodiments wherein the imaging sensor 4 comprises a plurality of cameras the distance of the optical axes might provide the benchmark information. The imaging sensor 4 might also be a scanner, a ToF camera or any suitable alternative providing 3D images.

Figure 2A:
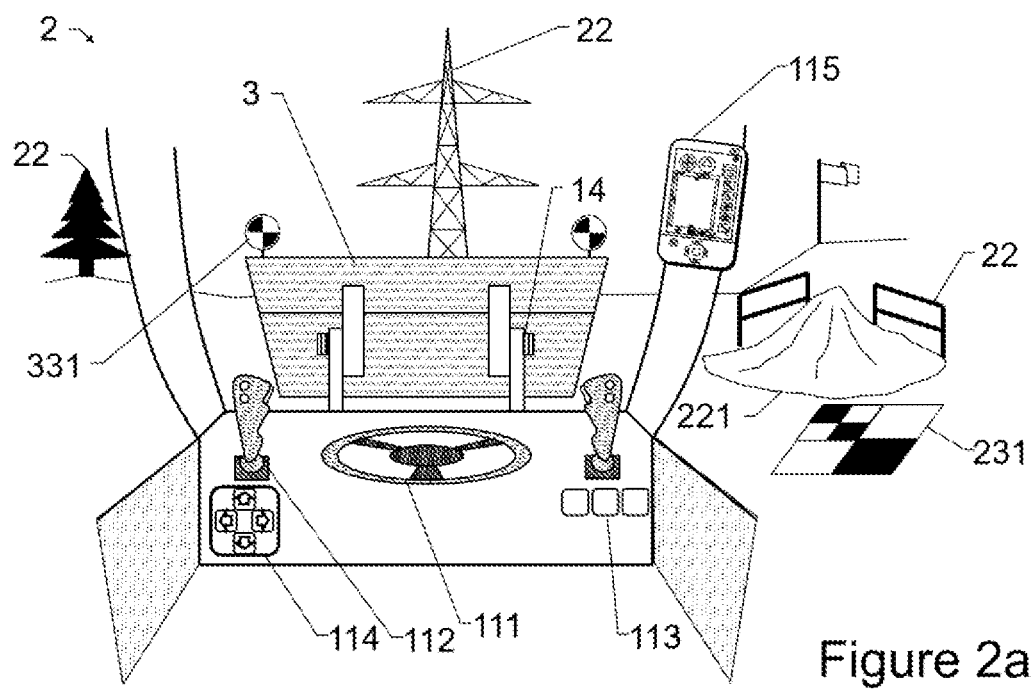
FIG. 2a shows a sketch of a view from the driver seat of a work vehicle.

FIG. 2a illustrates a view from a driver seat of the work vehicle. By way of example the here depicted point of view might also be treated as a point of view of the sensor. Since the present disclosure places no limitation on the sensor pose other than being referenceable to the pose of the work vehicle any of such sensor poses might be utilized. The operator might provide operator commands via a series of input interface elements 111-115, in the here depicted embodiment a steering wheel 111, one or more joysticks 112, switches or buttons 113, a button box 114, or an input area of a touchscreen 115. The person skilled in the art could utilize alternative realization of the input interface elements 111-115 to provide operator commands.

The implement 3 is mounted via the implement joint 14 and comprise a referencing plate with standardized shape and size. Such referencing plates are beneficial as they might act as an implement referencing object 331 providing an absolute scale information for the implement, however the present disclosure is applicable in the absence of such plates. The environment 2 comprise environment objects 22,221, 231 wherein e.g. the earth heap 221 is the work object of the current work task. Wherever the distinction between a real world object and its imaged counterpart is of importance the distinctive designation "real world" or "imaged" will be utilized. Where such distinction is self-explanatory or the feature can be equally applied to both the "real world object" and the "imaged object" no further designation will be used.

Figure 2B:
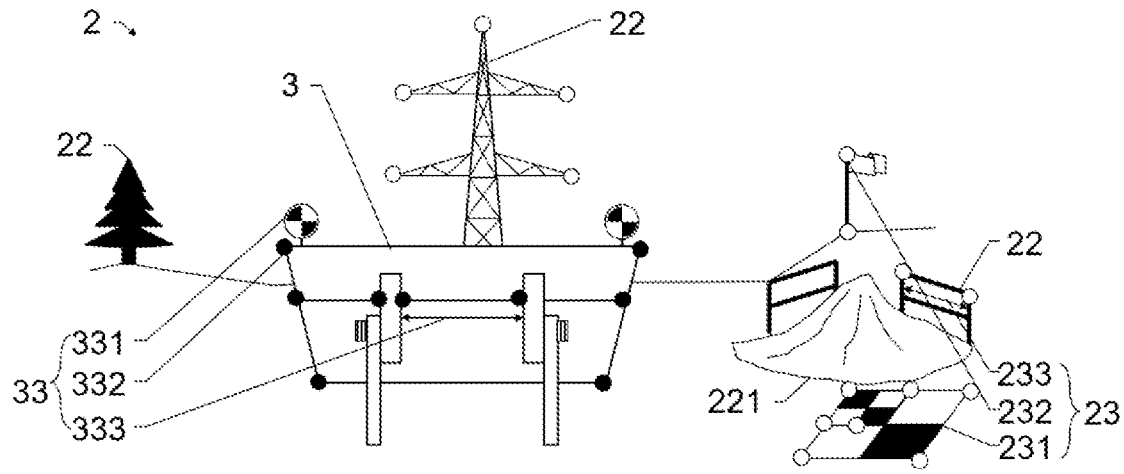
FIG. 2b shows an image comprising a part of an environment and an implement, with some trackable features marked.

FIG. 2b shows an identification of the implement features 33. The implement features 33 are trackable by a feature tracking algorithm and their relative arrangement is representative of the implement geometry. By tracking a plurality of implement features 33 the pose of the further implement features, and in particular the pose of the contact domain is determinable. Implement features might be distinguishable points 332, in particular corners. Extended objects 333, e.g. two visual points with a specific distance might also be catalogized as implement features 33. Furthermore, the referencing plate 331, due to its specific shape, size and high contrast might also be an implement features.

Environment features 23 might be defined similarly to the implement features 33. Some of the environment features 23 might be pre-existing features such as the peak of the flagpole as an example of point-like environment features 232 or the distance of poles of the fence, as an example of extended environment features 233. Some environment features 23 might be supplementary features, e.g. the reference mat as an environment referencing object 231. The environment referencing object 231 might have standardized shape and size. For a precise and effective execution of the work task the relative pose of the contact domain to the work object 221 shall be known. Since during the execution of the work task neither the work object 221 nor the contact domain is visible this can be realized by tracking of further environment 23 and implement features 33.

Figure 2C:
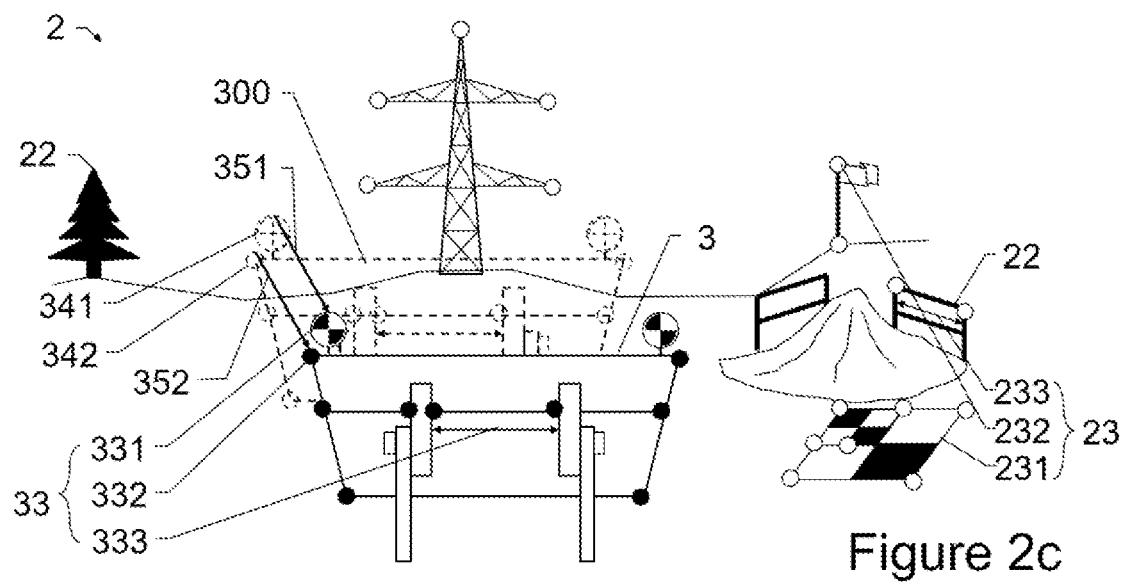
FIG. 2c illustrates the principle of feature tracking by comparing two images, taken after an implement movement.

FIG. 2c illustrates the feature tracking by an example wherein the imaged implement 3 has moved from an old position in the image 300 to the actual one. For the sake of simplicity the illustrated movement in the image, as in the real world is a translation movement without a significant change of imaged implement size. The specific features for other cases, in particular wherein a rotation movement is performed, or where the apparent size of imaged environment objects 22 or the implement 3 changes significantly might be applied accordingly.

In the in FIG. 2c depicted example the imaged environment objects 22 and the respective environment features 23 remained in the same position. The implement features 33 undergone a position change e.g. implement referencing object 331 has propagated from its previous position 341 along the translation vector 351, while the corner 332 has propagated from its previous position 342 along the translation vector 352. On the basis of the tracking the imaged implement features 33 for a series of different real world movements an arrangement information of the implement features with respect to each other, in particular in an implement-centered coordinate system could be derived.

Similarly on the basis of the tracking the imaged environment features 23 for a series of different real world movements of the sensor relative to the environment 2 a 3D environment model could be derived. In the here depicted example the implement 3 comprises an implement referencing object 331 providing a real scale of the implement. Similarly, the environment 2 comprises an environment referencing object 231 providing the benchmark information to derive a 3D environment model. Instead of the respective referencing objects 231,331 known distances 233,333 might also provide the scaling data. Accessing both the implement and environment scaling data is an especially beneficial way of utilizing the present disclosure. Nevertheless the present disclosure might be performed on the basis of accessing only the benchmark information.

Figure 3A:
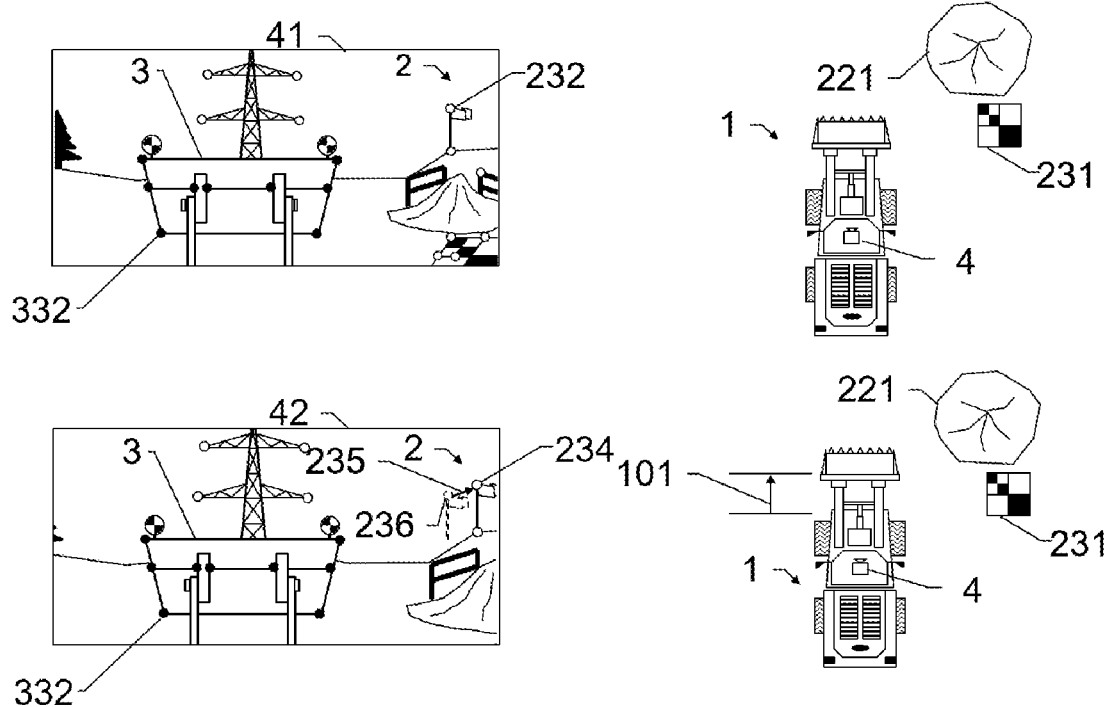
FIG. 3a shows an example of obtaining a second set of images.

FIG. 3a illustrates the obtaining of the second set of images. By way of example the images are 2D images. The present disclosure might be equally applicable with 3D images, in particular with 3D images derived from a lidar or profiler measurement. The images might be intensity images, color images, hyperspectral images or any suitable alternative. The first image 41 of the second set is taken from a first pose of the work vehicle 1 relative to the environment 2, illustrated by the relative pose to two environment objects: the earth heap as work object 221, and the referencing mat as environment referencing object 231. The imaging sensor 4 is mounted on the work vehicle 1 such that its pose is referenceable to the work vehicle. The pose of the work vehicle thus can be treated as equivalent to the sensor pose in the depicted embodiment. The first image 41 of the second set comprise a part of the environment 2 and the implement 3. The feature tracking algorithm identifies the implement and the environment features. For brevity and transparency reasons only point-like environment 232 and implement features 332 are shown. The specifics relating to the application of extended implement or environment features might be applied accordingly.

The second image 42 of the second set is taken from a second pose of the work vehicle 1. The pose change 101, here a translation vector, is provided by other means, e.g. by an odometer, GNSS receivers or a TPS. The relative pose of the implement 3 to the imaging sensor 4 did not change between the first 41 and second images 42 of the second set of images. Accordingly the implement features 332 remained at the same position on the images. Since poses of the sensor relative to the environment are different at the first 41 and second images 42 of the second set of images, the individual environment features have different position in the first 236 and the second images 234. A displacement 235 of the environment features can be obtained for each environment feature. The 3D environment model can be derived on the basis of the imaged displacement 235 of the environment features and the real world pose change 101 of the sensor.

Figure 3B:
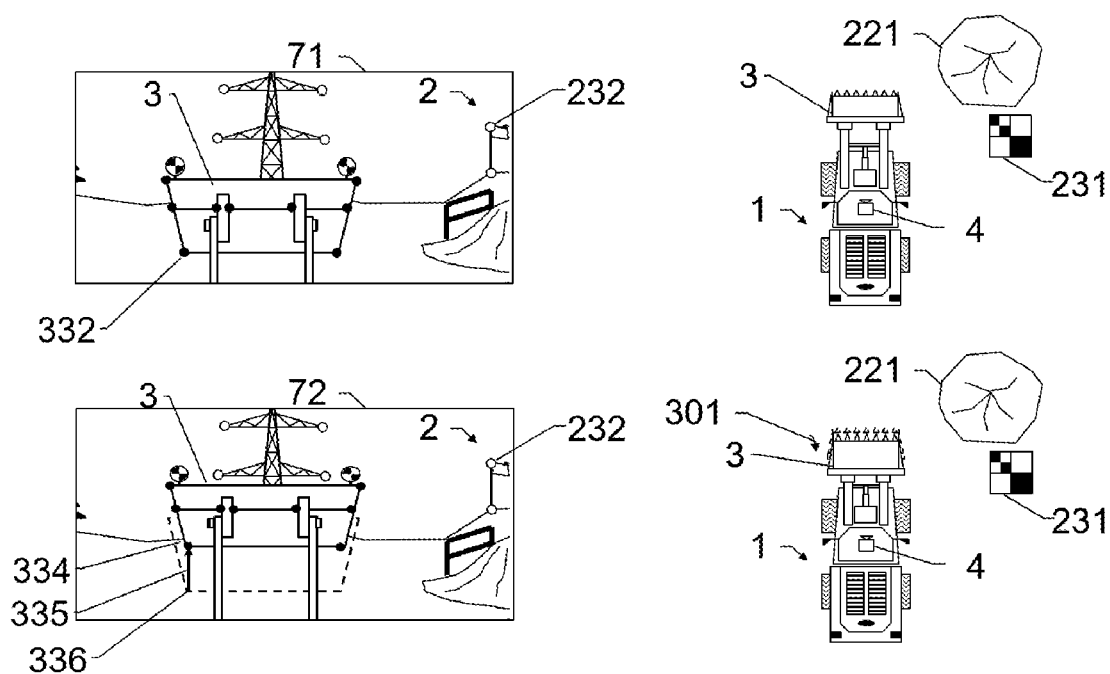
FIG. 3b shows an example of obtaining a third set of images.

FIG. 3b illustrates the obtaining of the third set of images. The pose of the work vehicle 1 relative to the environment 2, illustrated by the relative pose to two environment objects: the earth heap as work object 221, and the referencing mat as environment referencing object 231, is the same on both the first 71 and second images 72 of the third set, whereas the implement 3 has different poses. The pose change 301 of the implement is provided by other means, e.g. by internal inertial sensors of the implement.

The first image 71 of the third set comprise a part of the environment 2 and the implement 3. The feature tracking algorithm identifies the implement and the environmental features. For brevity and transparency reasons only point-like implement 332 and environment features 232 are shown. The specifics relating to the application of extended implement or environment features might be applied accordingly. The second image 72 of the third set is taken from a second pose of the implement. The relative pose of the imaging sensor 4 to the environment 2 did not change between the first 71 and second images 72 of the third set of images. Accordingly, the environment features 232 remained at the same position on the images 71,72. Since poses of the implement relative to the sensor are different at the first 71 and second images 72 of the third set of images, the individual implement features have different position in the first 336 and the second images 334. The displacement 335 of the implement features can be obtained for each implement feature. The arrangement information of the implement features with respect to each other, in particular in an implement-centered coordinate system, can be derived on the basis of the imaged displacement 335 of the implement features and the real world pose change 301 of the implement.

Figure 4:
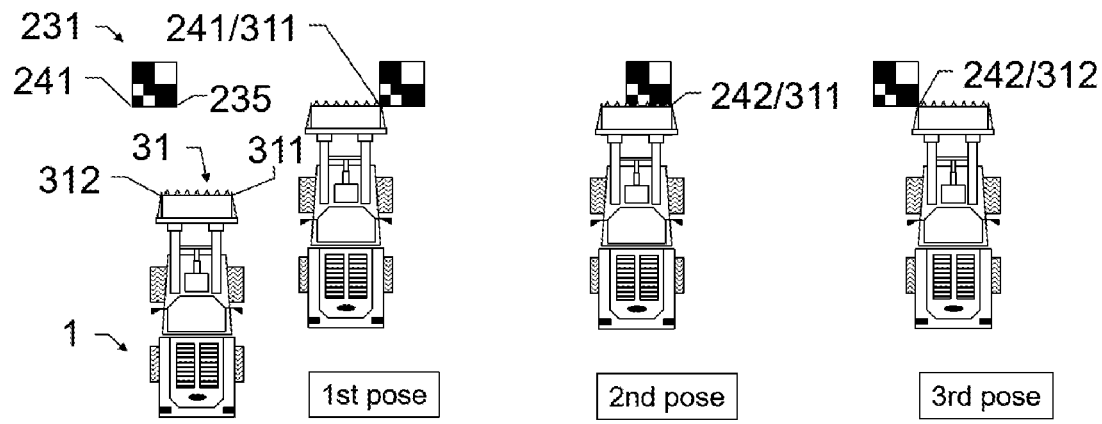
FIG. 4 shows a scheme of the first implement benching.

FIG. 4 shows an embodiment of the first implement benching. The environment comprises a referencing mat as an environment referencing object 231, with known dimensions. The environment referencing object 231 has a first 241 and a second benching point 242. The work vehicle 1 has a mounted implement 31, wherein the implement has a first 311 and a second feature of the implement 312. In the first pose of the implement the first benching point 241 is touched with the first feature of the implement 311 and the first pose of the implement is recorded. The first pose might an absolute pose in a referenced coordinate system or a relative system intern pose. The application of the present disclosure is not limited to a specific reference system. In the second pose of the implement the second benching point 242 is touched with the first feature of the implement 311 and the second pose of the implement is recorded. In the third pose of the implement the second benching point 242 is touched with the second feature of the implement 312 and the third pose of the implement is recorded. The second and third poses are recorded in the same reference system as the first pose. The benchmark information is provided based on the first, second and third poses of the implement.

Figure 5:
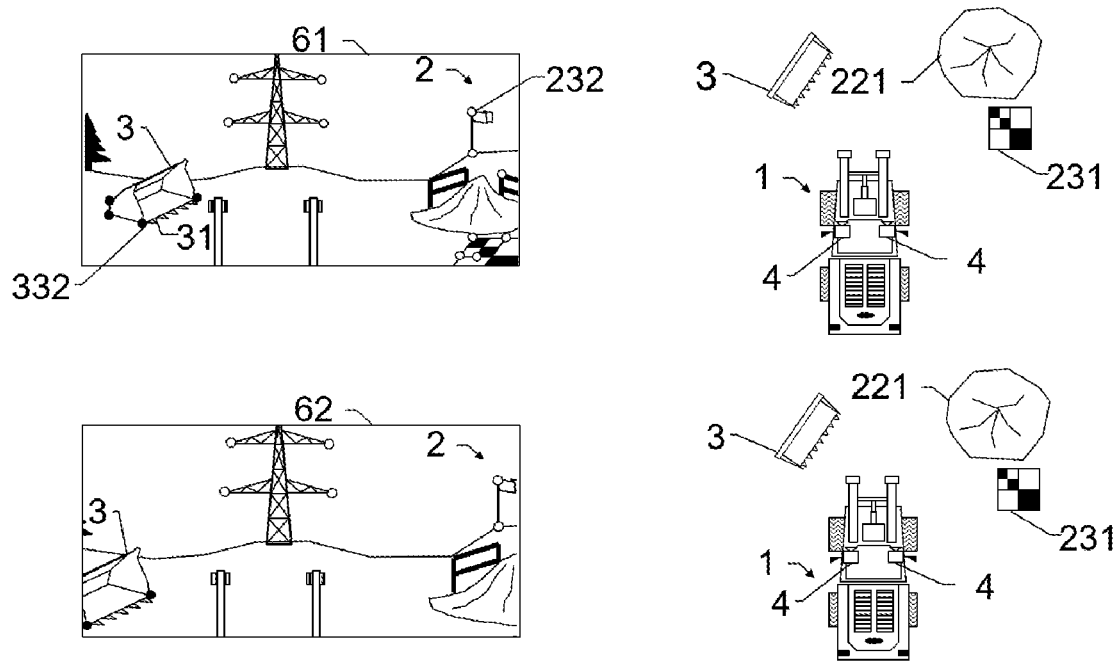
FIG. 5 shows a scheme of accessing arrangement information of implement features via a dismounted implement.

FIG. 5 depicts a scheme of accessing the arrangement information of the implement features with respect to each other, in particular in an implement-centered coordinate system, via tracking the features of a dismounted implement 3. Since the implement 3 is dismounted, it can be treated as being part of the environment 2, similarly to e.g. the depicted work object 221 and environment referencing object 231. The environment 2 might comprise further objects. The implement features are generally equivalent to the further environmental features. For brevity and transparency reasons only point-like implement 332 and environment features 232 are shown. It is beneficial that in at least one image 61,62 of the first set of images obtained such that both the contact domain 31 of the implement 3 and at least some further implement features are visible. In those case the arrangement information of the implement features with respect to each other in an implement-centered coordinate system also comprise the pose of the contact domain. The 3D environment model is derived on the basis of analyzing a relative arrangement of tracked environment features within the first set of images 61,62 obtained by the imaging sensor 4 at different poses of the work vehicle 1. For the sake of transparency only two images 61,62 are depicted in FIG. 5, and a simple translation movement was shown to indicate the concept. The complete geometry of the implement, including the implement features might not be visible from a given viewpoint, is determined by combining information from a plurality of viewing angles. In the depicted embodiment the imaging sensor 4 comprises two cameras, alternative realization of the imaging sensor 4 are within the sense of the disclosure. Upon establishing the arrangement information of the implement features with respect to each other, the implement 3 might be mounted to the work vehicle 1 to perform the further steps of the method.

Figure 6:
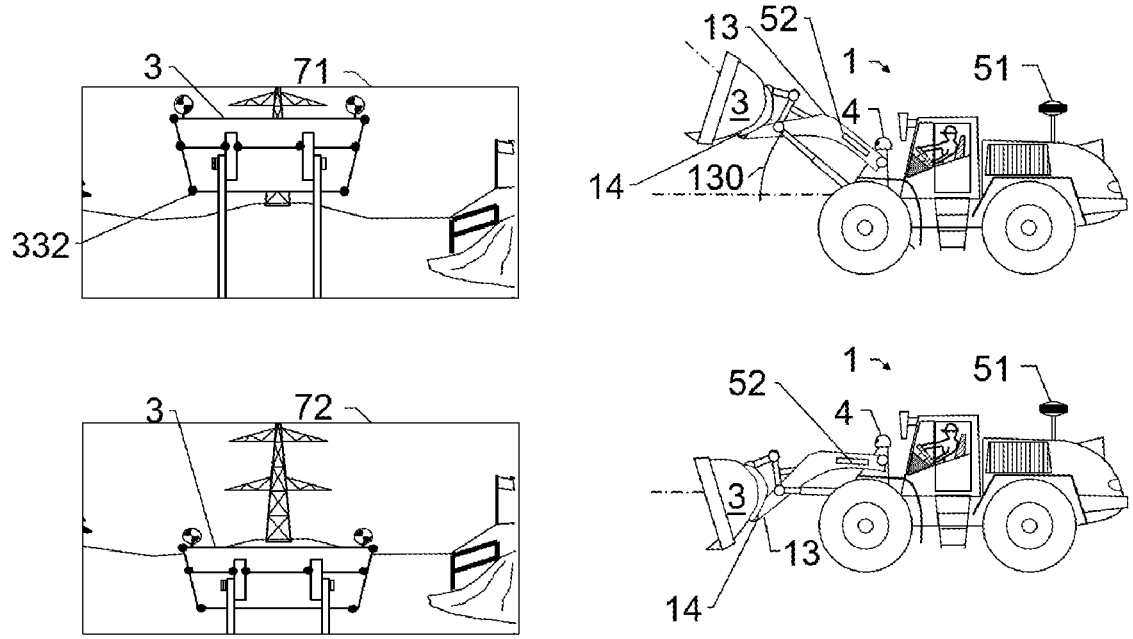
FIG. 6 shows a scheme of calibrating implement pose sensors utilizing the third set of images.

FIG. 6 depicts an embodiment of the work vehicle 1 further comprising an implement pose sensor 52, depicted as an inclinometer providing an elevation angle 130 of the arm 13. The present disclosure is not restricted to the calibration of this specific implement pose sensor 52, but can be applied to any implement pose sensors 52, in particular sensors providing sensor readings regarding pitch, and/or yaw and/or heading angles of the implement joint, a state of hydraulic cylinders and/or electric motors operating the arm 13 or the implement joint 14. Furthermore, the present disclosure is not restricted to the calibration of a single implement pose sensor 52 but might allow the calibration of a plurality of such sensors. The calibration might access information from the set of positioning sensors 51, depicted as a GNSS receiver.

The first image 71 of the third set is acquired at a first implement pose sensor calibration state while implement pose sensor readings are assigned to the first image 71 of the third set. The feature tracking algorithm identifies the implement features, for brevity and transparency reasons only point-like implement features 332 are shown, and the controller determines the pose of the implement 3 on the basis of the positional information for the implement features within the 3D environment model. The second image 72 of the third set is acquired at a second implement pose sensor calibration state while the implement pose sensor readings are assigned to the second image 72 of the third set. The controller determines the pose of the implement 3 on the basis of the positional information for the implement features within the 3D environment model. The implement pose sensor calibration parameters are provided based on the pose of the implement 3 relative to the environment and the assigned sensor readings.

Although aspects are illustrated above, partly with reference to some specific embodiments, it must be understood that numerous modifications and combinations of different features of the embodiments can be made. All of these modifications lie within the scope of the appended claims.

The invention claimed is:

1. A method for tracking a movable implement of a work vehicle, the method comprises:
accessing image data comprising images recorded by an imaging sensor during movement of the work vehicle and providing a view associated to a sensor pose of the imaging sensor referenceable to a vehicle pose onto an environment and at least part of the implement during movement of the implement relative to the imaging sensor,
deriving 3D map data by applying a feature tracking algorithm to the image data, wherein the 3D map data provide a 3D environment model and relative referencing of the sensor pose within the 3D environment model,
tracking implement features imaged by the image data at different poses of the implement relative to the imaging sensor and, based thereof, determining implement tracking data providing:
positional information for the implement features within the 3D environment model, and
arrangement information of the implement features with respect to each other,
accessing benchmark information that provides a real distance between two benchmark points of the environment imaged by the image data and/or a real distance between two benchmark points of the implement imaged by the image data, and using the benchmark information to provide the implement tracking data with absolute scale information, such that the positional information provides for deriving changes of position of the implement features in an absolute scale, and using the implement tracking data for the tracking of the implement.

2. The method according to claim 1 comprising a first implement benching to provide the benchmark information, wherein the first implement benching comprises:

providing an environment referencing object, in particular a referencing mat, with two benching points, in a first pose of the implement touching a first benching point with a first feature of the implement and recording the first pose of the implement, in a second pose of the implement touching a second benching point with the first feature of the implement and recording the second pose of the implement, in a third pose of the implement touching the second benching point with a second feature of the implement and recording the third pose of the implement, providing the absolute scale information, based on the first, second and third poses of the implement, wherein the first and second features of the implement comprising edges and/or corners of the implement, wherein the method further comprising the steps of identifying automatically the environment referencing object, in particular wherein the environment referencing object is identified based on a stored database comprising a list of referencing objects with associated trackable features enabling an identification of the referencing objects by the feature tracking algorithm and associated absolute scale information to derive the benchmark information, executing the first implement benching in an automatized or automatic manner.

3. The method according to claim 1 comprising a second implement benching to provide the benchmark information, wherein the second implement benching comprises:

providing a benching object comprising a benching contact, in a fourth pose of the implement touching the benching contact with a third feature of the implement and recording the fourth pose of the implement, in a fifth pose of the implement touching the benching contact with a fourth feature of the implement and recording the fifth pose of the implement, providing an absolute distance information between the third feature of the implement and the fourth feature of the implement, on the basis of the pose change of the work vehicle, providing the absolute scale information, based on the absolute distance of the third and the fourth feature of the implement.

4. The method according to claim 1 wherein:

the image data comprises a first set of images, wherein the first set of images comprises at least one image of the unmounted implement such that a contact domain of the implement and a plurality of implement features are visible, providing the arrangement information of the implement features with respect to each other utilizing the first set of images.

5. The method according to claim 1 wherein the image data comprises a second set of images comprising two images, wherein:

a first image of the second set comprises a plurality of tracked environment features, a second image of the second set comprises the tracked environment features from the first image of the second set, during the acquisition of the first and the second images of the second set of images poses of the sensor relative to the environment are different and poses of the implement relative to the sensor are identical, a third set of images comprising two images, wherein:

a first image of the third set comprises a plurality of tracked implement features, a second image of the third set comprises the tracked implement features from the first image of the third set, during the acquisition of the first and the second images of the third set of images the poses of the sensor relative to the environment are identical and the poses of the implement relative to the sensor are different.

6. The method according to claim 5 further comprising an implement pose sensor calibration, the implement pose sensor calibration comprising:

acquiring the first image of the third set at a first implement pose sensor calibration state and assigning implement pose sensor readings regarding a pose of the implement to the image, acquiring the second image of the third set at a second implement pose sensor calibration state and assigning the implement pose sensor readings to the image, providing implement pose sensor calibration parameters based on the poses of the implement respectively derived from implement tracking data and the assigned implement pose sensor readings.

7. The method according to claim 5, wherein accessing benchmark information comprises:

acquiring the first image of the second set of images in a first benchmark position, providing steering commands to steer the work vehicle to a second benchmark position by a translation movement along a view axis of the imaging sensor, and providing a pose change between the first and second benchmark positions, by utilizing a GNSS receiver, acquiring the second image of the second set of images in the second benchmark position, providing the benchmark information based on the relative arrangement of the environment features in the second set of images and the pose change between the first and second benchmark positions.

8. The method according to according to claim 5, wherein the benchmark information is provided further on the basis of a digital model of the implement, in particular a digital model provided by the manufacturer, wherein the digital model of the implement comprises distances and/or sizes of implement features, in particular a length and/or distances of corners and/or distances of implement mounting elements.

9. The method according to claim 8 further comprising an imaging sensor correction based on the digital model of the implement, the imaging sensor correction comprises:

providing the digital model of the implement, providing the arrangement information of the implement features in a plurality of implement poses relative to the imaging sensor such that the arrangement information of the implement is referenceable to the digital model of the implement, deriving camera distortion data based on a deviation of the arrangement information of the implement features at the respective implement pose and the digital model of the implement, deriving correction parameters to the imaging sensor based on the camera distortion data, and applying the correction parameters in providing the 3D environment model and the relative referencing of the sensor pose within the 3D environment model.

10. A system for tracking an implement of a work vehicle, wherein the system is configured to carry out the method of claim 1, for which it comprises a computing unit and an imaging sensor, wherein the imaging sensor is configured to:

be arranged on the work vehicle such that a pose of the imaging sensor is referenceable to the work vehicle and, provide image data to the computing unit enabling a tracking of a pose of the implement relative to an environment, the computing unit is configured to:

execute a feature tracking algorithm to track implement and environment features based on the received image data, provide a 3D environment model and relative referencing of the sensor pose within the 3D environment model based on the tracking of environment features, and derive a pose of the implement relative to the environment utilizing the feature tracking algorithm.

11. A system for tracking an implement of a work vehicle, wherein the system is configured to carry out the method of claim 9, for which it comprises a computing unit and an imaging sensor, wherein the imaging sensor is configured to:

be arranged on the work vehicle such that a pose of the imaging sensor is referenceable to the work vehicle and, provide image data to the computing unit enabling a tracking of a pose of the implement relative to an environment, the computing unit is configured to:

execute a feature tracking algorithm to track implement and environment features based on the received image data, provide a 3D environment model and relative referencing of the sensor pose within the 3D environment model based on the tracking of environment features, and derive a pose of the implement relative to the environment utilizing the feature tracking algorithm.

12. The system according to claim 10, wherein the system further comprises an input interface and an output interface, wherein the input interface configured to receive operator steering commands regarding a desired pose or movement of the implement, in particular by utilizing the 3D environment model, the computing unit further configured to provide implement movement commands based on the received operator steering commands and further based on the pose of the implement relative to the environment, the output interface configured to display:

the 3D environment model, a representation of the desired pose or movement of the implement in the 3D environment model, and arrangement information of the implement features with respect to each other.

13. The system according to claim 10, wherein the computing unit is configured to receive a digital representation data on at least a part of the environment, wherein the digital representation data comprise:

information representing a present and/or a past and/or a planned future state of the environment, and/or information representing a work task to be carried out by the work vehicle, the computing unit is further configured to:

reference the digital representation data to the 3D environment model, provide implement movement commands further based on the digital representation data, update the digital representation data based on the image data.

14. The system according to claim 10, wherein:

the system further comprises a set of implement pose sensors configured to provide an implement pose based on implement pose sensor readings, the computing unit is configured to execute a visual tracking mode and a sensor tracking mode, wherein positional information for the implement features within the 3D environment model are provided by the imaging sensor in the visual tracking mode, and the implement pose sensor in the sensor tracking mode, in particular wherein the sensor tracking mode is activated when the imaging sensor loses the tracked implement features, the computing unit is further configured to reestablish visual tracking of the implement features based on data provided by the sensor tracking mode.

15. The system according to claim 14, wherein the implement pose sensor exhibit a calibration mode and a measurement mode, wherein in the calibration mode calibration parameters of the implement pose sensor are calibrated utilizing the visual tracking mode either by:

executing a calibration movement action of the implement, or adjusting the implement pose sensor calibration parameters based on a deviation between positional information for the implement features within the 3D environment model provided by visual and sensor tracking modes, in the measurement mode the implement pose sensor provides data for executing the sensor tracking mode wherein the implement pose sensor configured to provide a request for calibration feedback based on:

the deviation between positional information for the implement features within the 3D environment model provided by visual and sensor tracking modes, and/or a time elapsed since the last calibration, and/or a shock event, wherein a measured velocity or acceleration exceeding a shock threshold.

16. A computer program product comprising program code which is stored on a non-transitory machine-readable medium, and has computer-executable instructions for performing, the automatic execution of the computational steps of the method according to claim 1.

17. A computer program product comprising program code which is stored on a non-transitory machine-readable medium, and has computer-executable instructions for performing, the automatic execution of the computational steps of the method according to claim 9.

* * * * *